(12) United States Patent
Kohinata (10) Patent No.: US 11,891,478 B2
(45) Date of Patent: Feb. 6, 2024

(54) LIQUID CRYSTAL POLYESTER FIBERS

(71) Applicant: SUMITOMO CHEMICAL COMPANY, LIMITED, Tokyo (JP)

(72) Inventor: Yusaku Kohinata, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 89 days.

(21) Appl. No.: 17/461,359

(22) Filed: Aug. 30, 2021

(65) Prior Publication Data

US 2021/0388157 A1 Dec. 16, 2021

Related U.S. Application Data

(62) Division of application No. 16/961,590, filed as application No. PCT/JP2019/000185 on Jan. 8, 2019, now Pat. No. 11,370,881.

(30) Foreign Application Priority Data

Jan. 18, 2018 (JP) ................................ 2018-006322

(51) Int. Cl.
*C08G 63/60* (2006.01)
*D01F 6/84* (2006.01)

(52) U.S. Cl.
CPC ............. *C08G 63/605* (2013.01); *D01F 6/84* (2013.01); *D10B 2401/063* (2013.01)

(58) Field of Classification Search
CPC .... C08G 63/605; D01F 6/84; D10B 2401/063
See application file for complete search history.

(56) References Cited

U.S. PATENT DOCUMENTS

| | | | | |
|---|---|---|---|---|
| 8,759,474 B2 * | 6/2014 | Ohtomo | ................ | C08G 63/88 528/274 |
| 2003/0008979 A1 | 1/2003 | Suenaga et al. | | |
| 2005/0054811 A1 | 3/2005 | Ueno et al. | | |
| 2007/0225420 A1 | 9/2007 | Komatsu et al. | | |
| 2007/0293633 A1 | 12/2007 | Hosoda et al. | | |
| 2009/0048362 A1 | 2/2009 | Ueno et al. | | |
| 2009/0108234 A1 | 4/2009 | Tano et al. | | |
| 2010/0041855 A1 | 2/2010 | Hosoda et al. | | |
| 2010/0104870 A1 | 4/2010 | Funatsu et al. | | |
| 2011/0315438 A1 | 12/2011 | Ito et al. | | |
| 2013/0122272 A1 | 5/2013 | Kim | | |
| 2015/0073068 A1 | 3/2015 | Komatsu et al. | | |
| 2018/0134098 A1 | 5/2018 | Inoue | | |
| 2021/0061948 A1 | 3/2021 | Kohinata | | |

FOREIGN PATENT DOCUMENTS

| | | | |
|---|---|---|---|
| JP | 03-294517 | A | 12/1991 |
| JP | 06-341014 | A | 12/1994 |
| JP | 2010-043380 | A | 2/2010 |
| JP | 2011-202290 | A | 10/2011 |
| JP | 2012-012467 | A | 1/2012 |
| JP | 2012-031556 | A | 2/2012 |
| JP | 2012031556 | * | 2/2012 |
| JP | 2017-166110 | A | 9/2017 |
| TW | 200902782 | A | 1/2009 |
| TW | 201210825 | A | 3/2012 |
| WO | 2017/022589 | A1 | 2/2017 |

OTHER PUBLICATIONS

Chinese Office Action issued in corresponding Chinese Patent Application No. 201980007373.2, dated Apr. 15, 2022, with English translation.
Japanese Decision of Refusal issued in corresponding Japanese Patent Application No. 2019-566424, dated Feb. 21, 2023, with English translation.
Chinese Decision of Rejection issued in corresponding Chinese Patent Application No. 201980007373.2, dated Feb. 23, 2023, with English translation.
U.S. PTO Non-Final Office Action issued in corresponding related parent U.S. Appl. No. 16/691,590, dated Oct. 13, 2021.
Chinese Office Action issued in corresponding Chinese Patent Application No. 201980007373.2, dated Oct. 21, 2022, with English translation.
International Search Report issued in corresponding International Patent Application No. PCT/JP2019/000185, dated Feb. 26, 2019, with English translation.
U.S. Appl. No. 16/691,590.
Taiwanese Office Action issued in corresponding Taiwanese Patent Application No. 108101348, dated Aug. 8, 2022, with English translation.
Japanese Notice of Reasons for Refusal issued in corresponding Japanese Patent Application No. 2019-566424, dated Sep. 27, 2022, with English translation.

(Continued)

*Primary Examiner* — Frances Tischler
*Assistant Examiner* — Gennadiy Mesh
(74) *Attorney, Agent, or Firm* — Rimon P.C.; Tomoki Tanida (57) ABSTRACT

A liquid crystal polyester fiber includes a liquid crystal polyester having a tensile strength is 25 cN/dtex to 30 cN/dtex, and an orientation degree of the fiber is 94% to less than 100%. The liquid crystal polyester has repeating units of Formula (1), Formula (2), and Formula (3). At least one repeating unit of Formula (1), Formula (2), and Formula (3) contains 2,6-naphthylene. A content of the repeating unit containing the 2,6-naphthylene is 68 to 80 mol % with respect to a total content of all the repeating units. The liquid crystal polyester fiber has a fiber diameter of 5 to 100 µm; (1) —O—$Ar^1$—CO—, (2) —CO—$Ar^2$—CO—, and (3) —X—$Ar^3$—Y—, wherein $Ar^1$ represents phenylene, naphthylene, or biphenylylene, $Ar^2$ and $Ar^3$ each independently represent phenylene, naphthylene, or biphenylylene, $Ar^1$, $Ar^2$, or $Ar^3$ contains 2,6-naphthylene, X and Y independently represent oxygen or —NH—, and $Ar^1$, $Ar^2$, or $Ar^3$ may be substituted.

2 Claims, 1 Drawing Sheet

(56) References Cited

OTHER PUBLICATIONS

Taiwanese Office Action issued in corresponding Taiwanese Patent Application No. 108101348, dated Apr. 21, 2023, with English translation.

* cited by examiner

LIQUID CRYSTAL POLYESTER FIBERS

CROSS REFERENCE TO RELATED APPLICATIONS

This application is a Divisional of U.S. patent application Ser. No. 16/961,590, filed Jul. 10, 2020, which is the U.S. National Phase under 35 U.S.C. § 371 of International Application No. PCT/JP2019/000185, filed on Jan. 8, 2019, which claims the benefit of Japanese Application No. 2018-006322, filed on Jan. 18, 2018, the entire contents of each are hereby incorporated by reference.

TECHNICAL FIELD

The present invention relates to liquid crystal polyester fibers and highly strengthened liquid crystal polyester fibers.

Priority is claimed on Japanese Patent Application No. 2018-006322, filed Jan. 18, 2018, the content of which is incorporated herein by reference.

BACKGROUND ART

A liquid crystal polyester is widely used as a material for electronic components since it has good low hygroscopicity, heat resistance, and thin-wall formability. In recent years, it has been considered that the liquid crystal polyester is fiberized by utilizing characteristics of the liquid crystal polyester.

In general, liquid crystal polyester fibers obtained by fiberizing the liquid crystal polyester are molded by melting the liquid crystal polyester and by then extruding and stretching the melted liquid crystal polyester via pores. In this case, the lower the viscosity of the melted liquid crystal polyester, the finer the fibers can be obtained, and the more satisfactorily the fiberization can be performed (Patent Document 1).

CITATION LIST

Patent Documents

[Patent Document 1] JP2010-43380A

SUMMARY OF THE INVENTION

Problems to be Solved by the Invention

Fibers molded using a liquid crystal polyester which has been known exhibit a high strength. However, there is demand for an increase in the strength, and there is room for improvement.

The present invention has been contrived in view of such circumstances, and an object thereof is to provide liquid crystal polyester fibers from which liquid crystal polyester fibers having an increased strength can be obtained, and highly strengthened liquid crystal polyester fibers (for example, having a tensile strength of 25 cN/dtex or greater).

Means to Solve the Problems

In order to achieve the object, according to one aspect of the present invention, liquid crystal polyester fibers are provided which are obtained by melt spinning a liquid crystal polyester, in which the liquid crystal polyester has a repeating unit represented by Formula (1), a repeating unit represented by Formula (2), and a repeating unit represented by Formula (3), the repeating unit containing a 2,6-naphthylene group is contained in an amount of 40 mol % or greater with respect to a total content of all the repeating units of the liquid crystal polyester, and an orientation degree of the liquid crystal polyester in a flow direction is 89% to 95%.

(1)

(2)

(3)

($Ar^1$ represents a phenylene group, a naphthylene group, or a biphenylylene group. $Ar^2$ and $Ar^3$ each independently represent a phenylene group, a naphthylene group, or a biphenylylene group. X and Y each independently represent an oxygen atom or an imino group (—NH—). Hydrogen atoms of the group represented by $Ar^1$, $Ar^2$, or $Ar^3$ may be each independently substituted with a halogen atom, an alkyl group having 1 to 10 carbon atoms, or an aryl group having 6 to 20 carbon atoms.)

In one aspect of the present invention, the liquid crystal polyester may contain the repeating unit containing a 2,6-naphthylene group in an amount of 65 mol % to 85 mol % with respect to the total content of all the repeating units.

According to one aspect of the present invention, provided are high-strength liquid crystal polyester fibers which are obtained by heat-treating the above liquid crystal polyester fibers at a temperature of 250° C. or higher.

That is, the present invention includes the following aspects.

[1] A liquid crystal polyester fiber containing a liquid crystal polyester,
in which the liquid crystal polyester has a repeating unit represented by Formula (1), a repeating unit represented by Formula (2), and a repeating unit represented by Formula (3),
at least one repeating unit selected from the group consisting of the repeating unit represented by Formula (1), the repeating unit represented by Formula (2), and the repeating unit represented by Formula (3) contains a 2,6-naphthylene group,
a content of the repeating unit containing the 2,6-naphthylene group is 40 mol % or greater with respect to a total content of all the repeating units of the liquid crystal polyester, and
an orientation degree of the liquid crystal polyester in a length direction of the fiber is 89% to 95%.

(1)

(2)

(3)

($Ar^1$ represents a phenylene group, a naphthylene group, or a biphenylylene group, $Ar^2$ and $Ar^3$ each independently represent a phenylene group, a naphthylene group, or a biphenylylene group, and at least one selected from the group consisting of $Ar^1$, $Ar^2$, and $Ar^3$ contains a 2,6-naphthylene group. X and Y each independently represent an oxygen atom or an imino group (—NH—). Hydrogen atoms of the group represented by $Ar^1$, $Ar^2$, or $Ar^3$ may be each independently substituted with a halogen atom, an alkyl group having 1 to 10 carbon atoms, or an aryl group having 6 to 20 carbon atoms.)

[2] The liquid crystal polyester fiber according to [1], in which the content of the repeating unit containing the 2,6-naphthylene group is 65 mol % to 85 mol % with respect to the total content of all the repeating units of the liquid crystal polyester.
[3] A liquid crystal polyester fiber containing a liquid crystal polyester, in which a tensile strength is 25 cN/dtex to 30 cN/dtex.
[4] A liquid crystal polyester fiber, in which an orientation degree of the liquid crystal polyester in a length direction of the fiber in the liquid crystal polyester fiber according to [3] is 94% to less than 100%.
[5] The liquid crystal polyester fiber according to [3] or [4], in which the liquid crystal polyester has a repeating unit represented by Formula (1), a repeating unit represented by Formula (2), and a repeating unit represented by Formula (3),
at least one repeating unit selected from the group consisting of the repeating unit represented by Formula (1), the repeating unit represented by Formula (2), and the repeating unit represented by Formula (3) contains a 2,6-naphthylene group, and
a content of the repeating unit containing the 2,6-naphthylene group is 40 mol % or greater with respect to a total content of all the repeating units of the liquid crystal polyester.

—O—Ar$^1$—CO— (1)

—CO—Ar$^2$—CO— (2)

—X—Ar$^3$—Y— (3)

(Ar$^1$ represents a phenylene group, a naphthylene group, or a biphenylylene group, Ar$^2$ and Ar$^3$ each independently represent a phenylene group, a naphthylene group, or a biphenylylene group, and at least one selected from the group consisting of Ar$^1$, Ar$^2$, and Ar$^3$ contains a 2,6-naphthylene group. X and Y each independently represent an oxygen atom or an imino group (—NH—). Hydrogen atoms of the group represented by Ar$^1$, Ar$^2$, or Ar$^3$ may be each independently substituted with a halogen atom, an alkyl group having 1 to 10 carbon atoms, or an aryl group having 6 to 20 carbon atoms.)

[6] The liquid crystal polyester fiber according to [5], in which the content of the repeating unit containing the 2,6-naphthylene group is 65 mol % to 85 mol % with respect to the total content of all the repeating units of the liquid crystal polyester.

Effects of the Invention

According to one aspect of the present invention, liquid crystal polyester fibers are provided from which liquid crystal polyester fibers having an increased strength can be obtained, and highly strengthened liquid crystal polyester fibers.

EMBODIMENTS FOR CARRYING OUT THE INVENTION

Liquid crystal polyester fibers and highly strengthened liquid crystal polyester fibers according to an embodiment will be described.

Liquid crystal polyester fibers according to this embodiment are obtained by melt spinning a liquid crystal polyester using a method to be described later. In this specification, a material obtained by molding a liquid crystal polyester into pellets is also referred to as "liquid crystal polyester".

[Liquid Crystal Polyester]

Preferably, a liquid crystal polyester related to the liquid crystal polyester fibers according to this embodiment exhibits liquid crystallinity in a melted state and is melted at a temperature of 300° C. to 450° C. The liquid crystal polyester may be a liquid crystal polyester amide, a liquid crystal polyester ether, a liquid crystal polyester carbonate, or a liquid crystal polyester imide. The liquid crystal polyester is preferably a wholly aromatic liquid crystal polyester which is obtained using only an aromatic compound as a raw material monomer.

Typical examples of the liquid crystal polyester include:
(I) a polymer obtained by polymerizing (polycondensing) an aromatic hydroxycarboxylic acid, an aromatic dicarboxylic acid, and at least one kind of compound selected from the group consisting of aromatic diols, aromatic hydroxylamines, and aromatic diamines;
(II) a polymer obtained by polymerizing a plurality of kinds of aromatic hydroxycarboxylic acids;
(III) a polymer obtained by polymerizing an aromatic dicarboxylic acid and at least one kind of compound selected from the group consisting of aromatic diols, aromatic hydroxylamines, and aromatic diamines; and
(IV) a polymer obtained by polymerizing a polyester such as a polyethylene terephthalate and an aromatic hydroxycarboxylic acid.

The aromatic hydroxycarboxylic acid, the aromatic dicarboxylic acid, the aromatic diol, the aromatic hydroxylamine, or the aromatic diamine contains a 2,6-naphthylene group.

Here, the aromatic hydroxycarboxylic acid, the aromatic dicarboxylic acid, the aromatic diol, the aromatic hydroxylamine, and the aromatic diamine each independently may have a polymerizable derivative, instead of part or the entirety thereof.

Examples of the polymerizable derivative of the compound having a carboxyl group such as an aromatic hydroxycarboxylic acid and an aromatic dicarboxylic acid are those obtained by converting a carboxyl group into an alkoxycarbonyl group or an aryloxycarbonyl group (that is, esters), those obtained by converting a carboxyl group into a haloformyl group (that is, acid halides), and those obtained by converting a carboxyl group into an acyloxycarbonyl group (that is, acid anhydrides).

Examples of the polymerizable derivative of the compound having a hydroxy group such as an aromatic hydroxycarboxylic acid, an aromatic diol, and an aromatic hydroxylamine include those obtained by converting a hydroxy group into an acyloxyl group through acylation (that is, acylated products).

Examples of the polymerizable derivative of the compound having an amino group such as an aromatic hydroxylamine and an aromatic diamine include those obtained by converting an amino group into an acylamino group through acylation (acylated amino group).

The liquid crystal polyester related to the liquid crystal polyester fibers according to this embodiment has a repeating unit represented by Formula (1) (hereinafter, may be referred to as "repeating unit (1)"), a repeating unit represented by Formula (2) (hereinafter, may be referred to as "repeating unit (2)"), and a repeating unit represented by Formula (3) (hereinafter, may be referred to as "repeating unit (3)").

(1)

(2)

(3)

($Ar^1$ represents a phenylene group, a naphthylene group, or a biphenylylene group, $Ar^2$ and $Ar^3$ each independently represent a phenylene group, a naphthylene group, or a biphenylylene group, and at least one selected from the group consisting of $Ar^1$, $Ar^2$, and $Ar^3$ contains a 2,6-naphthylene group. X and Y each independently represent an oxygen atom or an imino group (—NH—). Hydrogen atoms of the group represented by $Ar^1$, $Ar^2$, or $Ar^3$ may be each independently substituted with a halogen atom, an alkyl group having 1 to 10 carbon atoms, or an aryl group having 6 to 20 carbon atoms.)

Examples of the halogen atom include a fluorine atom, a chlorine atom, a bromine atom, and an iodine atom.

The alkyl group is preferably an alkyl group having 1 to 10 carbon atoms, and examples thereof include a methyl group, an ethyl group, an n-propyl group, an isopropyl group, an n-butyl group, an isobutyl group, a s-butyl group, a t-butyl group, an n-hexyl group, a 2-ethylhexyl group, an n-octyl group, and an n-decyl group.

The aryl group is preferably an aryl group having 6 to 20 carbon atoms, and examples thereof include a phenyl group, an o-tolyl group, an m-tolyl group, a p-tolyl group, a 1-naphthyl group, and a 2-naphthyl group.

In a case where the hydrogen atoms of the group represented by $Ar^1$, $Ar^2$, or $Ar^3$ are substituted with these groups, the number of the hydrogen atoms substituted is, for example, 2 or less, and preferably 1 independently for each group represented by $Ar^1$, $Ar^2$, or $Ar^3$.

The repeating unit (1) is a repeating unit derived from a predetermined aromatic hydroxycarboxylic acid.

In this specification, the term "derived" means that the chemical structure is changed due to the polymerization of the raw material monomers, and other structural changes do not occur.

The repeating unit (1) is preferably a repeating unit in which $Ar^1$ is a p-phenylene group (for example, a repeating unit derived from a p-hydroxybenzoic acid), or a repeating unit in which $Ar^1$ is a 2,6-naphthylene group (for example, a repeating unit derived from a 6-hydroxy-2-naphthoic acid).

The repeating unit (2) is a repeating unit derived from a predetermined aromatic dicarboxylic acid. The repeating unit (2) is preferably a repeating unit in which $Ar^2$ is a p-phenylene group (for example, a repeating unit derived from a terephthalic acid), a repeating unit in which $Ar^2$ is a m-phenylene group (a repeating unit derived from an isophthalic acid), a repeating unit in which $Ar^2$ is a 2,6-naphthylene group (for example, a repeating unit derived from a 2,6-naphthalenedicarboxylic acid), or a repeating unit in which $Ar^2$ is a diphenylether-4,4'-diyl group (for example, a repeating unit derived from a diphenylether-4,4'-dicarboxylic acid).

The repeating unit (3) is a repeating unit derived from a predetermined aromatic diol, an aromatic hydroxylamine, or an aromatic diamine. The repeating unit (3) is preferably a repeating unit in which $Ar^3$ is a p-phenylene group (for example, a repeating unit derived from hydroquinone, p-aminophenol, or p-phenylenediamine), or a repeating unit in which $Ar^3$ is a 4,4'-biphenylylene group (a repeating unit derived from 4,4'-dihydroxybiphenyl, 4-amino-4'-hydroxybiphenyl, or 4,4'-diaminobiphenyl).

The content of the repeating unit (1) is, for example, mol % or greater, preferably 30 mol % to 80 mol %, more preferably 40 mol % to 70 mol %, and even more preferably 45 mol % to 65 mol % with respect to the total amount of all the repeating units of the liquid crystal polyester (that is, a value obtained as follows: the mass of each repeating unit of the liquid crystal polyester is divided by a formula weight of the each repeating unit to obtain the substance equivalent (mol) of each repeating unit, and then the obtained results are added up).

The content of the repeating unit (2) is, for example, 35 mol % or less, preferably 10 mol % to 35 mol %, more preferably 15 mol % to 30 mol %, and even more preferably 17.5 mol % to 27.5 mol % with respect to the total amount of all the repeating units of the liquid crystal polyester.

The content of the repeating unit (3) is, for example, 35 mol % or less, preferably 10 mol % to 35 mol %, more preferably 15 mol % to 30 mol %, and even more preferably 17.5 mol % to 27.5 mol % with respect to the total amount of all the repeating units of the liquid crystal polyester.

The liquid crystal polyester having such a predetermined repeating unit composition has a good balance between heat resistance and moldability. The larger the content of the repeating unit (1), the more the melt flowability, or heat resistance, strength, and rigidity of a molded product are likely to be improved. However, in a case where the content is too large, the melting temperature and the melt viscosity are likely to be increased, and a temperature required for molding is likely to be increased.

In one aspect, in a case where the content of the repeating unit (1) is within the above range, melt flowability, or heat resistance, strength, and rigidity of a molded product are likely to be improved, and adjustment to a melting temperature or a melt viscosity suitable for molding is easily performed.

The content of the repeating unit (2) and the content of the repeating unit (3) are preferably substantially equal. That is, a ratio of the content of the repeating unit (2) to the content of the repeating unit (3) is, for example, 0.9/1 to 1/0.9, preferably 0.95/1 to 1/0.95, and even more preferably 0.98/1 to 1/0.98 in terms of [content of repeating unit (2)]/[content of repeating unit (3)] (mol/mol).

Two or more kinds of repeating units (1), two or more kinds of repeating units (2), and two or more kinds of repeating units (3) may be each independently included in the liquid crystal polyester.

In addition, the liquid crystal polyester may have a repeating unit other than the repeating units (1) to (3), and the content thereof is, for example, 10 mol % or less, and preferably 5 mol % or less with respect to the total amount of all the repeating units of the liquid crystal polyester.

In one aspect, the total content of the repeating unit (1), the repeating unit (2), and the repeating unit (3) is 90 mol % to 100 mol %, and preferably 95 mol % to 100 mol % with respect to the total amount of all the repeating units of the liquid crystal polyester.

The liquid crystal polyester related to the liquid crystal polyester fibers according to the present embodiment preferably has, as the repeating unit (3), a repeating unit in which X and Y are each an oxygen atom. That is, the liquid crystal polyester preferably has a repeating unit derived from a predetermined aromatic diol. Accordingly, the melt viscosity of the liquid crystal polyester is likely to be reduced. More preferably, the liquid crystal polyester has, as the repeating unit (3), only a repeating unit in which X and Y are each an oxygen atom.

In the liquid crystal polyester related to the liquid crystal polyester fibers according to the present embodiment, the content of the repeating unit containing a 2,6-naphthylene group is 40 mol % or greater with respect to the total content of all the repeating units of the liquid crystal polyester. In a case where liquid crystal polyester fibers formed of such a liquid crystal polyester is subjected to a heat treatment step to be described later, liquid crystal polyester fibers having an increased strength can be obtained. In addition, liquid crystal polyester fibers having good electric characteristics (for example, low dielectric loss tangent) can be obtained. In addition, the content of the repeating unit containing the 2,6-naphthylene group is preferably 85 mol % or less with respect to the total content of all the repeating units of the liquid crystal polyester.

In a case where $Ar^1$ of the repeating unit (1) is a 1,4-phenylene group, Are of the repeating unit (2) is any one of a 1,4-phenylene group and a 1,3-phenylene group, and Ara of the repeating unit (3) contains a 4,4'-biphenylylene group in the liquid crystal polyester related to the liquid crystal polyester fibers according to the present embodiment, fibers to be obtained have a good strength and a good elastic modulus.

In the liquid crystal polyester related to the liquid crystal polyester fibers according to the present embodiment, the content of the repeating unit containing the 2,6-naphthylene group is preferably 65 mol % or greater, more preferably 68 mol % or greater, and even more preferably 70 mol % or greater with respect to the total content of all the repeating units of the liquid crystal polyester.

In the liquid crystal polyester, the content of the repeating unit containing the 2,6-naphthylene group is preferably 82 mol % or less, and more preferably 80 mol % or less with respect to the total content of all the repeating units of the liquid crystal polyester.

The upper limit and the lower limit can be optionally combined.

In one aspect, the content of the repeating unit containing the 2,6-naphthylene group is 40 mol % to 85 mol %, preferably 65 mol % to 85 mol %, more preferably 65 mol % to 82 mol %, even more preferably 68 mol % to 80 mol %, particularly preferably 70 mol % to 80 mol %, and extremely preferably 72 mol % to 77 mol % with respect to the total content of all the repeating units of the liquid crystal polyester.

In another aspect, the liquid crystal polyester related to the liquid crystal polyester fibers according to this embodiment is a liquid crystal polyester which has a repeating unit (1), a repeating unit (2), and a repeating unit (3),
in which at least one repeating unit selected from the group consisting of the repeating unit represented by Formula (1), the repeating unit represented by Formula (2), and the repeating unit represented by Formula (3) contains a 2,6-naphthylene group,
with respect to a total amount of all the repeating units of the liquid crystal polyester,
a content of the repeating unit (1) is 30 mol % or greater, preferably 30 mol % to 80 mol %, more preferably 40 mol % to 70 mol %, and even more preferably 45 mol % to 65 mol %,
a content of the repeating unit (2) is 35 mol % or less, preferably 10 mol % to 35 mol %, more preferably 15 mol % to 30 mol %, and even more preferably 17.5 mol % to 27.5 mol %, and a content of the repeating unit (3) is 35 mol % or less, preferably 10 mol % to 35 mol %, more preferably 15 mol % to 30 mol %, and even more preferably 17.5 mol % to 27.5 mol %,
a total content of the repeating units (1), (2), and (3) does not exceed 100 mol %, and
a content of the repeating unit containing the 2,6-naphthylene group is 40 mol % to 85 mol %, preferably 65 mol % to 85 mol %, more preferably 65 mol % to 82 mol %, even more preferably 68 mol % to 80 mol %, particularly preferably 70 mol % to 80 mol %, and extremely preferably 72 mol % to 77 mol % with respect to the total content of all the repeating units of the liquid crystal polyester.

The repeating unit (1) is preferably a repeating unit in which $Ar^1$ is a 2,6-naphthylene group (for example, a repeating unit derived from a 6-hydroxy-2-naphthoic acid).

The repeating unit (2) is preferably a repeating unit in which $Ar^2$ is a 2,6-naphthylene group (for example, a repeating unit derived from a 2,6-naphthalenedicarboxylic acid), or a repeating unit in which $Ar^2$ is a 1,4-phenylene group (a repeating unit derived from a terephthalic acid).

The repeating unit (3) is preferably a repeating unit in which $Ar^3$ is a 1,4-phenylene group (for example, a repeating unit derived from hydroquinone), or a repeating unit in which $Ar^3$ is a 4,4'-biphenylylene group (for example, a repeating unit derived from 4,4'-dihydroxybiphenyl).

The liquid crystal polyester having high heat resistance and melt tension is a liquid crystal polyester in which (i) a repeating unit (1) in which $Ar^1$ is a 2,6-naphthylene group, that is, a repeating unit derived from a 6-hydroxy-2-naphthoic acid is contained in an amount of preferably 40 mol % to 70 mol %, more preferably 45 mol % to 65 mol %, and even more preferably 50 mol % to 60 mol % with respect to a total amount of all the repeating units of the liquid crystal polyester,
(ii) a repeating unit (2) in which $Ar^2$ is a 2,6-naphthylene group, that is, a repeating unit derived from a 2,6-naphthalenedicarboxylic acid is contained in an amount of preferably 10 mol % to 30 mol %, more preferably 12.5 mol % to 27.5 mol %, and even more preferably 15 mol % to 25 mol %,
(iii) a repeating unit (2) in which $Ar^2$ is a 1,4-phenylene group, that is, a repeating unit derived from a terephthalic acid is contained in an amount of preferably 0 mol % to 15 mol %, more preferably 0 mol % to 12 mol %, and even more preferably 0 mol % to 10 mol %,
(iv) a repeating unit (3) in which $Ar^3$ is a 1,4-phenylene group, that is, a repeating unit derived from hydroquinone, or a repeating unit (3) in which $Ar^3$ is a 4,4'-biphenylylene group, that is, a repeating unit derived from 4,4'-dihydroxybiphenyl is contained in an amount of preferably 12.5 mol % to 30 mol %, more preferably 17.5 mol % to 30 mol %, and even more preferably 20 mol % to 25 mol %, and
(v) the amounts of $Ar^2$ and $Ar^3$ are substantially equimolar (that is, (total content of repeating unit derived from 2,6-naphthalenedicarboxylic acid and repeating unit derived from terephthalic acid)/(content of repeating unit derived from hydroquinone or repeating unit derived from 4,4'-dihydroxybiphenyl) (mol/mol) is 0.9/1 to 1/0.9, preferably 0.95/1 to 1/0.95, and more preferably 0.98/1 to 1/0.98). The component having high sublimability may be excessively contained in a range of less than 1 mol %.

In one aspect, the liquid crystal polyester related to the liquid crystal polyester fibers according to the present embodiment is a liquid crystal polyester in which with respect to a total amount of all the repeating units of the liquid crystal polyester, a content of a repeating unit derived from a 6-hydroxy-2-naphthoic acid is 40 mol % to 70 mol %, preferably 45 mol % to 65 mol %, and more preferably 50 mol % to 60 mol %, a content of a repeating unit derived from a 2,6-naphthalenedicarboxylic acid is 10 mol % to 30 mol %, preferably 12.5 mol % to 27.5 mol %, and more preferably 15 mol % to 25 mol %, a content of a repeating unit derived from a terephthalic acid is 0 mol % to 15 mol %, preferably 0 mol % to 12 mol %, and more preferably 0 mol % to 10 mol %, and a content of a repeating unit derived from hydroquinone or a repeating unit derived from 4,4'-dihydroxybiphenyl is 12.5 mol % to 30 mol %, preferably 17.5 mol % to 30 mol %, and more preferably is 20 mol % to 25 mol %, and (total content of the repeating unit derived from 2,6-naphthalenedicarboxylic acid and the repeating unit derived from terephthalic acid)/(content of the repeating unit derived from hydroquinone or the repeating unit derived from 4,4'-dihydroxybiphenyl) (mol/mol) is 0.9/1 to 1/0.9, preferably 0.95/1 to 1/0.95, and more preferably 0.98/1 to 1/0.98.

The liquid crystal polyester related to the liquid crystal polyester fibers according to this embodiment can be manufactured by polymerization (polycondensation) such that the total amount of monomers having a 2,6-naphthylene group (the total amount of the 6-hydroxy-2-naphthoic acid, the 2,6-naphthalenedicarboxylic acid, and the 2,6-naphthalenediol) is 40 mol % to 85 mol % with respect to the total amount of all the monomers.

The liquid crystal polyester related to the liquid crystal polyester fibers according to the present embodiment is preferably manufactured by melt polymerizing raw material monomers corresponding to the repeating units of the liquid crystal polyester and by solid phase polymerizing the obtained polymer (hereinafter, may be referred to as "prepolymer"). Accordingly, a liquid crystal polyester having a high molecular weight with high heat resistance, strength, and rigidity can be manufactured with good operability. Melt polymerization may be performed in the presence of a catalyst, and examples of the catalyst include metal compounds such as magnesium acetate, stannous acetate, tetrabutyl titanate, lead acetate, sodium acetate, potassium acetate, and antimony trioxide, and nitrogen-containing heterocyclic compounds such as 4-(dimethylamino)pyridine and 1-methylimidazole. Nitrogen-containing heterocyclic compounds are preferably used.

The liquid crystal polyester used as a raw material for the liquid crystal polyester fibers has a flow start temperature of, for example, 280° C. or higher, preferably 280° C. to 400° C., and more preferably 280° C. to 360° C. The higher the flow start temperature, the more the heat resistance, strength, and rigidity are likely to be improved. However, in a case where the flow start temperature is too high, the melting temperature and the melt viscosity are likely to be increased, and there is a tendency that the fiberization is not easily performed.

That is, in a case where the flow start temperature is within the above range, heat resistance, strength, and rigidity are likely to be improved, and adjustment to a melting temperature or a melt viscosity suitable for fiberization is easily performed.

The flow start temperature is also called a flow temperature. The flow start temperature is a temperature at which a viscosity of 4,800 Pa·s (48,000 poise) is exhibited in a case where the liquid crystal polyester is melted and extruded from a nozzle having an inner diameter of 1 mm and a length of 10 mm using a capillary rheometer under a load of 9.8 MPa (100 kg/cm$^2$) while the temperature is increased at a rate of 4° C./min, and is an index of the molecular weight of the liquid crystal polyester (see "Liquid Crystal Polymer-Synthesis, Molding, and Application-", edited by Naoyuki Koide, CMC Publishing Co., Ltd., Jun. 5, 1987, p. 95).

The liquid crystal polyester related to the liquid crystal polyester fibers according to the present embodiment is preferably melted and kneaded using an extruder, and then molded into pellets.

As the extruder, an extruder having a cylinder, at least one screw disposed in the cylinder, and at least one supply port provided in the cylinder is preferably used. As the extruder, an extruder having at least one vent portion provided in the cylinder is more preferably used. In addition, an extruder provided with a kneading portion is preferably used on the downstream side of the supply port (in a case where a plurality of supply ports are provided, the extruder is provided on the downstream side of each supply port). Here, the kneading portion means a part provided in part of the screw in order to efficiently perform the melting and kneading. Examples of the kneading portion include a kneading disc (right kneading disc, neutral kneading disc, right kneading disc) and a mixing screw.

In the extruder, pressure reduction equipment is preferably connected to a portion having at least one vent portion. By deaerating the inside of the cylinder of the extruder using the pressure reduction equipment during the melting and kneading of the liquid crystal polyester, the remaining low-molecular weight component can be removed from the liquid crystal polyester.

[Liquid Crystal Polyester Fibers and Highly Strengthened Liquid Crystal Polyester Fibers]

Liquid crystal polyester fibers according to this embodiment are obtained by melt spinning the above-described liquid crystal polyester.

In one aspect, the liquid crystal polyester fibers according to this embodiment preferably have a fiber diameter of 5 to 100 μm.

In addition, by heat-treating the liquid crystal polyester fibers according to this embodiment at a temperature of 250° C. to 350° C., it is possible to obtain liquid crystal polyester fibers having a higher strength than the liquid crystal polyester fibers before the heat treatment.

The reason for this is thought to be that the molecular weight of the liquid crystal polyester in the liquid crystal polyester fibers is increased by heat-treating the liquid crystal polyester fibers at a temperature of 250° C. or higher. This can be presumed from the fact that the liquid crystal polyester fibers are insoluble or hardly soluble in the good solvent of the liquid crystal polyester fibers.

The orientation degree of the liquid crystal polyester in a flow direction (MD direction) in the liquid crystal polyester fibers according to this embodiment is 89% to 95%. The higher the orientation degree of the liquid crystal polyester in the MD direction in the liquid crystal polyester fibers, the more the orientation direction of the liquid crystal polyester is likely to be aligned in the liquid crystal polyester fibers. Accordingly, the strength of the liquid crystal polyester fibers in the MD direction is thought to be increased. Therefore, the strength of the liquid crystal polyester fibers to be obtained finally is also thought to be increased.

In this specification, the "flow direction of the liquid crystal polyester in the liquid crystal polyester fibers" or the "MD direction" means a length direction of the liquid crystal polyester fiber. The "flow direction" and the "MD direction" may be referred to as the "length direction of the fiber", and the "orientation degree in the flow direction" may be referred to as the "orientation degree of the fiber in the length direction".

Due to the above reason, the orientation degree of the liquid crystal polyester in the length direction of the fiber in the liquid crystal polyester fibers is preferably 90% or greater, more preferably 93% or greater, and even more preferably 94% or greater.

However, through the study by the inventors, it has been found that in a case where the orientation degree of the liquid crystal polyester in the length direction of the fiber in the liquid crystal polyester fibers is too high (for example, greater than 95%), the strength of the liquid crystal polyester fibers is not improved even in a case where the heat treatment is performed, and thus highly strengthened liquid crystal polyester fibers cannot be obtained. It has been found that such a phenomenon occurs regardless of the structure in a liquid crystal polyester in which the content of a repeating unit containing a 2,6-naphthylene group is 40 mol % or greater with respect to the total content of all the repeating units of the liquid crystal polyester.

The inventors anticipated that in a case where the orientation degree of the liquid crystal polyester in the length direction of the fiber is too high (greater than 95%), the liquid crystal polyester has a structure in which it is difficult to increase the molecular weight. Accordingly, the inventors attempted to increase the molecular weight of the liquid crystal polyester in the liquid crystal polyester fibers by lengthening the heat treatment time of the liquid crystal polyester fibers to improve the strength of the liquid crystal polyester fibers.

However, it has been found that the strength of the liquid crystal polyester fibers is not improved even in a case where the heat treatment time of the liquid crystal polyester fibers is lengthened. Therefore, it can be said that although the cause is not clear, in a case where the orientation degree of the liquid crystal polyester in the length direction of the fiber in the liquid crystal polyester fibers is too high (greater than 95%), the increase in the strength of the liquid crystal polyester fibers before and after the heat treatment step is small, and highly strengthened liquid crystal polyester fibers cannot be obtained. Thus, the orientation degree of the liquid crystal polyester in the length direction of the fiber in the liquid crystal polyester fibers according to this embodiment is preferably 95% or less.

The upper limit and the lower limit of the orientation degree of the liquid crystal polyester in the length direction of the fiber in the liquid crystal polyester fibers according to this embodiment can be optionally combined.

In one aspect, the orientation degree of the liquid crystal polyester in the length direction of the fiber in the liquid crystal polyester fibers is preferably 90% to 95%, more preferably 93% to 95%, and particularly preferably 94% to 95%.

The orientation degree of the liquid crystal polyester in the length direction of the fiber in the liquid crystal polyester fibers according to this embodiment is adjusted in a range of 89% to 95% by appropriately controlling the conditions of a fiberizing step and a winding step to be described later.

The liquid crystal polyester fibers according to this embodiment may contain a resin or an additive other than the liquid crystal polyester, and in order to increase the strength of the liquid crystal polyester, the content of the liquid crystal polyester is preferably 80 mass % to 100 mass % with respect to the total mass of the liquid crystal polyester fibers.

(Orientation Degree)

The orientation degree of the liquid crystal polyester in the length direction of the fiber in the liquid crystal polyester fibers and the highly strengthened liquid crystal polyester fibers is calculated based on Formula (S1). A half-value width W can be obtained by measuring the intensity distribution of the diffraction peak of the Debye ring at 0° to 360° with a diffraction angle 2θ fixed to a diffraction peak near 20° by using a rotating anticathode X-ray diffractometer RINT2500 manufactured by Rigaku Corporation. W in Formula (S1) represents the half-value width (unit: °) of the diffraction peak intensity.

$$\text{Orientation Degree (\%) in Length Direction of Fiber} = \{(360 - \Sigma W)/360\} \times 100 \tag{S1}$$

[Liquid Crystal Polyester Fibers and Manufacturing Method Thereof]

Figure 1:
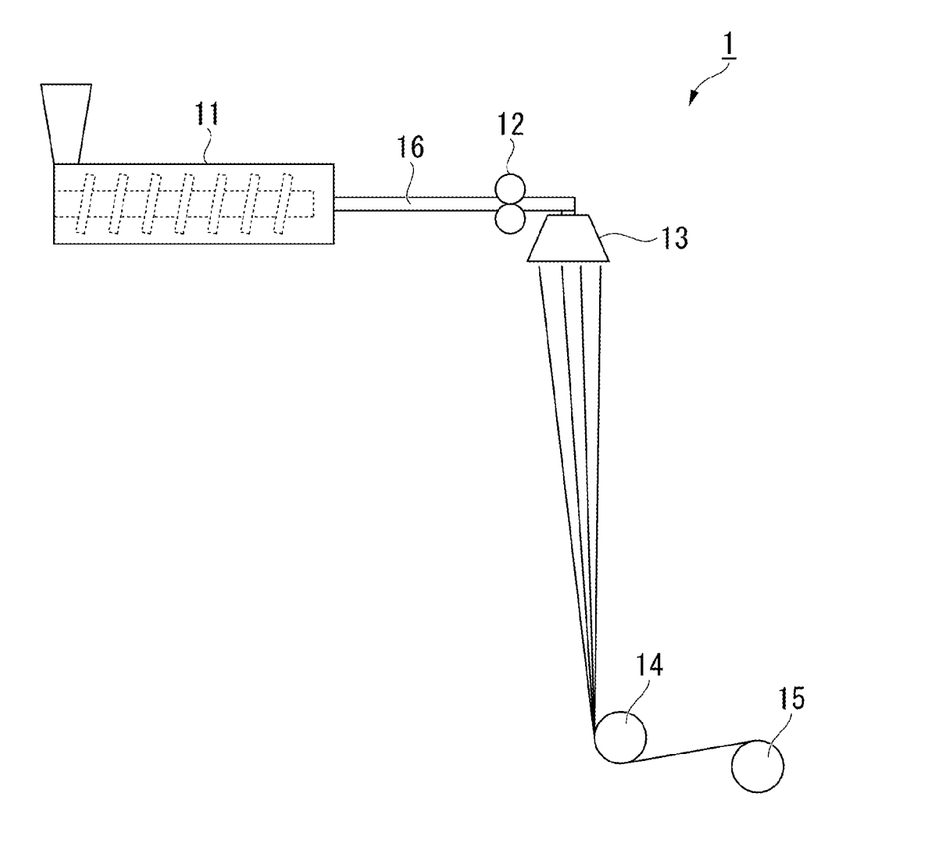
FIG. 1 is a schematic view showing an example of a spinning device according to a method of manufacturing liquid crystal polyester fibers according to an embodiment.

A method of manufacturing liquid crystal polyester fibers according to this embodiment will be described with reference to the drawing. FIG. 1 is a schematic view showing an example of a spinning device which is used in the method of manufacturing liquid crystal polyester fibers according to this embodiment.

A spinning device 1 is provided with an extruder 11, a gear pump 12, a nozzle portion 13, a take-up roller 14, a winding portion 15, and a resin flow path 16.

The spinning device 1 may be provided with a filter made of stainless steel or the like which is provided in the middle of the resin flow path 16 and an applicator which is provided between the nozzle portion 13 and the take-up roller 14 to apply a sizing agent, an oil, or the like.

The extruder 11 and the nozzle portion 13 are connected by the resin flow path 16. The gear pump 12 is provided in the middle of the resin flow path 16. The take-up roller 14 is provided below the nozzle portion 13.

The method of manufacturing liquid crystal polyester fibers according to this embodiment (melt spinning) includes a melting step, a fiberizing step, and a winding step.

(Melting Step)

In the melting step according to this embodiment, the extruder 11 melts the liquid crystal polyester at a flow start temperature or higher.

The extruder 11 is not particularly limited as long as the liquid crystal polyester can be melted at the flow start temperature or higher, and may be a single screw extruder or a twin screw extruder.

The melting temperature and the melting time of the liquid crystal polyester in the extruder 11 are preferably adjusted in such a range that the liquid crystal polyester does not decompose during melting. For example, the melting temperature is preferably 330° C. to 370° C., and the melting time is preferably 5 minutes to 30 minutes.

A light-resistant agent, various grains such as carbon black and titanium oxide, colorants such as a pigment and a dye, an antistatic agent, an antioxidant, and the like can also be added to the liquid crystal polyester used for the liquid crystal polyester fibers in such a range that the effects of the present invention are not impaired.

(Fiberizing Step)

In the fiberizing step according to this embodiment, the melted liquid crystal polyester is pressure-fed to the nozzle portion 13 by the gear pump 12, and extruded from the nozzle portion 13 to obtain a single fiber of the liquid crystal polyester.

The nozzle portion 13 has a plurality of nozzles. The hole diameter of the nozzle is preferably 0.05 mm to 0.20 mm, and more preferably 0.07 mm to 0.15 mm. In a case where the hole diameter of the nozzle is 0.20 mm or less, strong shear stress is likely to be applied to the liquid crystal polyester extruded from the nozzle. As a result, the orientation degree of the liquid crystal polyester in the length direction of the fiber in the liquid crystal polyester fibers is likely to be increased. In a case where the hole diameter of the nozzle is 0.05 mm or greater, the nozzle is less likely to be clogged with the liquid crystal polyester.

The amount of the liquid crystal polyester to be discharged from the nozzle portion 13 is preferably adjusted in such a range that the liquid crystal polyester fibers do not break during the melt spinning. The amount of the liquid crystal polyester to be discharged is, for example, 1 to 40 g/min, and preferably 10 to 30 g/min.

The shearing speed in the nozzle portion 13 is preferably 10,000 $s^{-1}$ to 100,000 $s^{-1}$, and more preferably 30,000 $s^{-1}$ to 80,000 $s^{-1}$. In a case where the shearing speed is 10,000 $s^{-1}$ or greater, strong shear stress is likely to be applied to the liquid crystal polyester extruded from the nozzle. As a result, the orientation degree of the liquid crystal polyester in the length direction of the fiber in the liquid crystal polyester fibers is likely to be increased. In a case where the shearing speed is 100,000 $s^{-1}$ or less, the liquid crystal polyester fibers are less likely to break during the melt spinning.

The number of nozzle holes in the nozzle portion 13 is not particularly limited, and may be appropriately selected according to the kind of the melt spinning device used and the amount of fibers required.

(Winding Step)

The winding step related to the method of manufacturing liquid crystal polyester fibers according to this embodiment includes: taking up a plurality of single fibers by the take-up roller 14 and winding the fibers around a SUS bobbin or the like by the winding portion 15 to obtain liquid crystal polyester fibers formed of the plurality of single fibers. In this case, the liquid crystal polyester fibers are so-called multifilaments.

The winding speed of the liquid crystal polyester fibers in the winding portion 15 is preferably 200 m/min to 1,500 m/min, and more preferably 400 m/min to 1,200 m/min. In a case where the winding speed of the liquid crystal polyester fibers is 200 m/min or higher, the liquid crystal polyester in the liquid crystal polyester fibers is likely to be extended in the longitudinal direction. As a result, the orientation degree of the liquid crystal polyester in the length direction of the fiber in the liquid crystal polyester fibers is likely to be increased. In a case where the winding speed of the liquid crystal polyester fibers is 1,500 m/min or lower, the liquid crystal polyester fibers are less likely to break.

The liquid crystal polyester fibers obtained after the winding step according to this embodiment is called "as-spun fibers". The strength of the liquid crystal polyester fibers according to this embodiment is about 5 to 8 cN/dtex. It can be said that the strength of the liquid crystal polyester fibers according to this embodiment is higher than that of organic fibers formed of nylon or polyester other than the liquid crystal polyester.

The strength of the liquid crystal polyester fibers refers to a tensile strength obtained by measurement at a measurement temperature of 23° C., a sample interval of 20 cm, and a tensile speed of 20 cm/min by using a tensile tester, for example, Autograph AG-1KNIS manufactured by Shimadzu Corporation.

The orientation degree of the liquid crystal polyester in the length direction of the fiber in the liquid crystal polyester fibers according to this embodiment is adjusted in a range of 89% to 95% based on the relationship between: the orientation degree of the liquid crystal polyester in the length direction of the fiber; and the shearing speed in the nozzle portion 13 and the winding speed in the winding portion 15.

[Highly Strengthened Liquid Crystal Polyester Fibers]

The liquid crystal polyester fibers according to this embodiment may be optionally heat-treated.

By heat-treating the liquid crystal polyester fibers according to this embodiment, it is possible to obtain liquid crystal polyester fibers in which the strength of the liquid crystal polyester fibers is increased.

[Highly Strengthened Liquid Crystal Polyester Fiber and Manufacturing Method Thereof]

A method of manufacturing highly strengthened liquid crystal polyester fibers according to this embodiment includes a heat treatment step.

In the heat treatment step according to this embodiment, the liquid crystal polyester fibers wound around a bobbin or the like are heated by an oven or the like. Accordingly, the molecular weight of the liquid crystal polyester in the liquid crystal polyester fibers is increased, and thus the strength of the liquid crystal polyester fibers is improved.

In the heat treatment step according to this embodiment, the heat treatment temperature is 250° C. to 350° C., preferably 270° C. to 340° C., more preferably 280° C. to 330° C., and even more preferably 290° C. to 320° C.

In a case where the heat treatment temperature is 250° C. or higher, the molecular weight of the liquid crystal polyester in the liquid crystal polyester fibers is likely to be increased. As a result, it is possible to obtain liquid crystal polyester fibers having an increased strength. In a case where the heat treatment temperature is 350° C. or lower, the liquid crystal polyester in the liquid crystal polyester fibers is less likely to melt. Accordingly, thermal fusion between the single fibers of the liquid crystal polyester is suppressed, and the strength of the single fibers of the liquid crystal polyester is likely to be enhanced. As a result, it is easy to maintain the strength of the entire liquid crystal polyester fibers.

In the heat treatment step according to this embodiment, the heat treatment time is preferably 0.5 hours to 50 hours, and more preferably 1 hour to 20 hours.

The atmosphere during the heat treatment is preferably an inert gas atmosphere such as nitrogen or argon or a vacuum having a vacuum degree of 13.3 kPa (100 mmHg) or less. However, since the liquid crystal polyester tends to be easily hydrolyzed, the atmosphere during the heat treatment is preferably a dehumidified inert gas atmosphere. For example, the dew point of the inert gas is preferably −20° C. or lower, and more preferably −50° C. or lower.

In one aspect, in the heat treatment step according to this embodiment, the liquid crystal polyester fibers discharged from the nozzle portion 13 may be heat-treated by being allowed to pass through a heating furnace.

In another aspect, in the heat treatment step according to this embodiment, the liquid crystal polyester fibers may be pulled out from a bobbin or the like after the winding step and heat-treated.

It has been found that the orientation degree of the liquid crystal polyester in the length direction of the fiber in the highly strengthened liquid crystal polyester fibers obtained as above is 90% to less than 100%, and preferably 94% to less than 100%, and is higher than that in the length direction of the liquid crystal polyester fiber. The reason for this is thought to be that the orientation direction of the liquid crystal polyester in the length direction of the fiber is aligned with an increase in the molecular weight of the liquid crystal polyester in the liquid crystal polyester fibers.

The tensile strength of the highly strengthened liquid crystal polyester fibers according to this embodiment is 25 cN/dtex to 30 cN/dtex. In another aspect, the tensile strength of the highly strengthened liquid crystal polyester fibers may be 26 cN/dtex to 30 cN/dtex, or 25 cN/dtex to 26 cN/dtex. The tensile strength of the highly strengthened liquid crystal polyester fibers according to this embodiment is 3 times to 6 times the tensile strength of the liquid crystal polyester fibers.

According to this embodiment, it is possible to obtain liquid crystal polyester fibers from which liquid crystal polyester fibers having an increased tensile strength can be obtained, and highly strengthened liquid crystal polyester fibers.

In one aspect, the liquid crystal polyester fibers according to this embodiment are fibers containing a liquid crystal polyester,
in which the liquid crystal polyester contains
a repeating unit derived from a 6-hydroxy-2-naphthoic acid as a repeating unit (1), a repeating unit derived from a terephthalic acid and a repeating unit derived from a 2,6-naphthalenedicarboxylic acid as a repeating unit (2), and a repeating unit derived from hydroquinone as a repeating unit (3), or
a repeating unit derived from a 6-hydroxy-2-naphthoic acid as a repeating unit (1), a repeating unit derived from a 2,6-naphthalenedicarboxylic acid as a repeating unit (2), and a repeating unit derived from 4,4-dihydroxybiphenyl as a repeating unit (3),
with respect to a total amount of all the repeating units of the liquid crystal polyester,
a content of the repeating unit (1) is 30 mol % or greater, preferably 30 mol % to 80 mol %, more preferably 40 mol % to 70 mol %, and even more preferably 45 mol % to 65 mol %,
a content of the repeating unit (2) is 35 mol % or less, preferably 10 mol % to 35 mol %, more preferably 15 mol % to 30 mol %, and even more preferably 17.5 mol % to 27.5 mol %, and
a content of the repeating unit (3) is 35 mol % or less, preferably 10 mol % to 35 mol %, more preferably 15 mol % to 30 mol %, and even more preferably 17.5 mol % to 27.5 mol %,
a total content of the repeating units (1), (2), and (3) does not exceed 100 mol %;
in the liquid crystal polyester, a content of the repeating unit containing a 2,6-naphthylene group is 40 mol % to 85 mol %, preferably 65 mol % to 85 mol %, more preferably 65 mol % to 82 mol %, even more preferably 68 mol % to 80 mol %, particularly preferably 70 mol % to 80 mol %, and extremely preferably 72 mol % to 77 mol % with respect to the total content of all the repeating units of the liquid crystal polyester;
an orientation degree of the liquid crystal polyester in a length direction of the fiber is 89% to 95%, preferably 90% to 95%, more preferably 93% to 95%, and even more preferably 94% to 95%; and
a tensile strength of the fibers is 5 to 8 cN/dtex.

In one aspect, the highly strengthened liquid crystal polyester fibers according to this embodiment are liquid crystal polyester fibers,
in which an orientation degree of the liquid crystal polyester in a length direction of the fiber in the liquid crystal polyester fibers is 90% to less than 100%, and preferably 94% to less than 100%; and
a tensile strength of the highly strengthened liquid crystal polyester fibers is 25 cN/dtex to 30 cN/dtex.

EXAMPLES

Examples of the present invention will be shown below, but the present invention is not limited thereto.

[Measurement of Orientation Degree of Liquid Crystal Polyester in Length Direction of Fiber]

The orientation degree of the liquid crystal polyester in the length direction of the fiber in the liquid crystal polyester fibers was calculated based on Formula (S1). A half-value width W was obtained by measuring the intensity distribution of the diffraction peak of the Debye ring at 0° to 360° with a diffraction angle 2θ fixed to a diffraction peak near 20° by using a rotating anticathode X-ray diffractometer RINT2500 manufactured by Rigaku Corporation. W in Formula (S1) represents a half-value width (unit: °) of the diffraction peak intensity.

Orientation Degree (%) in Length Direction of Fiber = $\{(360-\Sigma W)/360\} \times 100$     (S1)

[Measurement of Tensile Strength of Liquid Crystal Polyester Fibers]

The tensile strength of the liquid crystal polyester fibers was measured at a measurement temperature of 23° C., a sample interval of 20 cm, and a tensile speed of 20 cm/min by using Autograph AG-1KNIS manufactured by Shimadzu Corporation. The measurement was performed 5 times, and an average of the test results was used.

[Measurement of Flow Start Temperature of Liquid Crystal Polyester]

The flow start temperature of the liquid crystal polyester was measured using a flow characteristic evaluation device "Flow Tester CFT-500" manufactured by Shimadzu Corporation. A temperature at which a melt viscosity of 4,800 Pa·s (48,000 poise) was exhibited when about 2 g of a sample was filled in a capillary rheometer equipped with a die having an inner diameter of 1 mm and a length of 10 mm and the liquid crystal polyester was extruded from the nozzle at a rate of temperature increase of 4° C./min under a load of 9.8 MPa (100 kgf/cm$^2$) was defined as the flow start temperature.

Manufacturing Example 1

1,034.99 g (5.5 mol) of a 2-hydroxy-6-naphthoic acid, 272.52 g (2.475 mol, excessively added by 0.225 mol) of hydroquinone, 378.33 g (1.75 mol) of a 2,6-naphthalenedicarboxylic acid, 83.07 g (0.5 mol) of a terephthalic acid, 1,226.87 g (12.0 mol) of acetic anhydride, and 0.17 g of 1-methylimidazole as a catalyst were added to a reactor equipped with a stirrer, a torque meter, a nitrogen gas introduction tube, a thermometer, and a reflux condenser, and stirred for 15 minutes at room temperature. Then, the temperature was increased while the mixture was stirred. When the internal temperature reached 145° C., the mixture was stirred for 1 hour while the temperature was maintained at 145° C.

The content of the repeating unit containing a 2,6-naphthylene group calculated from the amount of the raw material monomers charged was 72.5 mol %.

Thereafter, 1.7 g of 1-methylimidazole was further added, and then the temperature was increased to 310° C. for 3 hours and 30 minutes while the distilled by-product acetic acid and the unreacted acetic anhydride were removed by distillation. The temperature was maintained at 310° C. for 3 hours, and the liquid crystal polyester was taken out in a melted state in a bat such that the thickness thereof was 2 cm.

The liquid crystal polyester thus obtained was cooled to about room temperature, solidified, and pulverized by a vertical pulverizer ("ORIENT VM-16" manufactured by SEISHINE Corporation) to obtain a prepolymer powder with a grain diameter of about 0.1 mm to about 1 mm. Part of the prepolymer powder obtained was taken out, and the flow start temperature of the powder was measured. The measurement result was 266° C.

The prepolymer powder was subjected to solid phase polymerization by increasing the temperature from 25° C. to 250° C. for 1 hour, increasing the temperature from 250° C. to 285° C. for 7 hours, and maintaining the temperature at 285° C. for 5 hours.

The powder after solid phase polymerization was cooled, and thus a liquid crystal polyester powder (resin A) was obtained. The flow start temperature of the liquid crystal polyester obtained was measured, and the measurement result was 315° C.

Manufacturing Example 2

987.90 g (5.25 mol) of a 2-hydroxy-6-naphthoic acid, 442.20 g (2.375 mol) of 4,4'-dihydroxybiphenyl, 513.50 g (2.375 mol) of a 2,6-naphthalenedicarboxylic acid, 1,229.80 g (11.5 mol) of acetic anhydride, and 0.17 g of 1-methylimidazole as a catalyst were added to a reactor equipped with a stirrer, a torque meter, a nitrogen gas introduction tube, a thermometer, and a reflux condenser, and stirred for 15 minutes at room temperature. Then, the temperature was increased while the mixture was stirred. When the internal temperature reached 145° C., the mixture was stirred for 1 hour while the temperature was maintained at 145° C.

The content of the repeating unit containing a 2,6-naphthylene group calculated from the amount of the raw material monomers charged was 76.3 mol %.

Thereafter, 1.7 g of 1-methylimidazole was further added, and then the temperature was increased to 310° C. for 3 hours and 30 minutes while the distilled by-product acetic acid and the unreacted acetic anhydride were removed by distillation. The temperature was maintained at 310° C. for 3 hours, and the liquid crystal polyester was taken out in a melted state in a bat such that the thickness thereof was 2 cm.

The liquid crystal polyester thus obtained was cooled to about room temperature, solidified, and pulverized by a vertical pulverizer ("ORIENT VM-16" manufactured by SEISHINE Corporation) to obtain a prepolymer powder with a grain diameter of about 0.1 mm to about 1 mm. Part of the prepolymer powder obtained was taken out, and the flow start temperature of the powder was measured. The measurement result was 261° C.

The prepolymer powder was subjected to solid phase polymerization by increasing the temperature from 25° C. to 250° C. for 1 hour, increasing the temperature from 250° C. to 285° C. for 10 hours, and maintaining the temperature at 285° C. for 5 hours. The powder after solid phase polymerization was cooled, and thus a liquid crystal polyester powder (resin B) was obtained. The flow start temperature of the liquid crystal polyester obtained was measured, and the measurement result was 324° C.

Manufacturing Example 3

911 g (6.6 mol) of a p-hydroxybenzoic acid, 409 g (2.2 mol) of 4,4'-dihydroxybiphenyl, 91 g (0.55 mol) of an isophthalic acid, 274 g (1.65 mol) of a terephthalic acid, and 1,235 g (12.1 mol) of acetic anhydride were added to a reactor equipped with a stirrer, a torque meter, a nitrogen gas introduction tube, a thermometer, and a reflux condenser, and stirred. Next, 0.17 g of 1-methylimidazole was added to the mixture after stirring, and the inside of the reactor was sufficiently substituted with a nitrogen gas. Then, the temperature was increased to 150° C. for 15 minutes under a nitrogen gas stream. The temperature was maintained at 150° C., and refluxing was carried out for 1 hour.

The content of the repeating unit containing a 2,6-naphthylene group calculated from the amount of the raw material monomers charged was 0 mol %.

Thereafter, 1.7 g of 1-methylimidazole was further added, and then the temperature was increased to 320° C. for 2 hours and 50 minutes while the distilled by-product acetic acid and the unreacted acetic anhydride were removed by distillation. The time point at which an increase in the torque was recognized was regarded as completion of the reaction, and the content was taken out.

A prepolymer powder having a grain diameter of about 0.1 mm to about 1 mm was obtained in the same manner as in manufacturing Example 1. Part of the prepolymer powder obtained was taken out, and the flow start temperature of the powder was measured. The measurement result was 257° C.

The prepolymer powder was subjected to solid phase polymerization by increasing the temperature from 25° C. to 250° C. for 1 hour, increasing the temperature from 250° C. to 270° C. for 2.5 hours, and maintaining the temperature at 270° C. for 5 hours. The powder after solid phase polymerization was cooled, and thus a liquid crystal polyester powder (resin C) was obtained. The flow start temperature of the liquid crystal polyester obtained was measured, and the measurement result was 316° C.

Manufacturing Example 4

1,209.9 g (8.76 mol) of a 4-hydroxybenzoic acid, 609.7 g (3.24 mol) of a 6-hydroxy-2-naphthoic acid, and 1,347.6 g (13.2 mol) of acetic anhydride were added to a reactor equipped with a stirrer, a torque meter, a nitrogen gas introduction tube, a thermometer, and a reflux condenser. The inside of the reactor was sufficiently substituted with a nitrogen gas. Then, the temperature was increased to 150° C. for 15 minutes under a nitrogen gas stream. The temperature was maintained at 150° C., and refluxing was carried out for 3 hours.

The content of the repeating unit containing a 2,6-naphthylene group calculated from the amount of the raw material monomers charged was 27.0 mol %.

Then, the temperature was increased to 290° C. for 4 hours while the distilled by-product acetic acid and the unreacted acetic anhydride were removed by distillation. The temperature was maintained at 290° C. for 1.5 hours, and the liquid crystal polyester was taken out in a melted state in a bat such that the thickness thereof was 2 cm.

A prepolymer powder having a grain diameter of about 0.1 mm to about 1 mm was obtained in the same manner as in manufacturing Example 1. Part of the prepolymer powder obtained was taken out, and the flow start temperature of the powder was measured. The measurement result was 235° C.

The prepolymer powder was subjected to solid phase polymerization by increasing the temperature from 25° C. to 265° C. for 10 hours, increasing the temperature from 265° C. to 265° C. for 7 hours, and maintaining the temperature at 265° C. for 5 hours.

The powder after solid phase polymerization was cooled, and thus a liquid crystal polyester powder (resin D) was obtained. The flow start temperature of the liquid crystal polyester obtained was measured, and the measurement result was 288° C.

Examples 1 to 3 and Comparative Examples 1 to 10

The liquid crystal polyesters obtained in Manufacturing Examples 1 to 4 were each melted and kneaded at a processing temperature shown in Table 1, and granulated into pellets using a twin screw extruder (PCM-30) manufactured by Ikegai Corporation.

Next, using a multifilament spinning device "POLYMERMATE V" manufactured by Chubu Kagaku Kikai Seisakusho K.K., the melted liquid crystal polyester was filtered through a filter (made of stainless steel), and then discharged from a nozzle having 24 holes with a hole diameter of 0.15 mm under conditions shown in Table 1. The fibers obtained by melt spinning were wound around a perforated metal bobbin. The orientation degree of the liquid crystal polyester in the length direction of the fiber and the tensile strength of the liquid crystal polyester fibers were measured, and the measurement results are shown in Table 2.

The liquid crystal polyester fibers were heat-treated under conditions shown in Table 1 in a state of being wound around a bobbin.

The orientation degree of the liquid crystal polyester in the length direction of the fiber and the tensile strength in the heat-treated liquid crystal polyester fibers obtained as above were measured, and the measurement results are shown in Table 2.

TABLE 1

| Evaluation Samples | | Examples/Comparative Examples | Content of 2,6-Naphthylene Group (mol %) | Granulation Temperature (° C.) (pelletizing temperature) | Spinning Temperature (° C.) | Discharge Amount (g/min) | Winding Speed (m/min) | Heat Treatment Conditions |
|---|---|---|---|---|---|---|---|---|
| Liquid Crystal Polyester | Resin A | Comparative Example 1 | 72.5 | 340 | 345 | 11 | 380 | 300° C. × 12 hr |
| | | Example 1 | | | 350 | 11 | 410 | |
| | | Example 2 | | | 355 | 12 | 460 | |
| | | Comparative Example 2 | | | 355 | 12 | 495 | |
| | Resin B | Comparative Example 3 | 76.3 | 340 | 345 | 10 | 350 | 300° C. × 12 hr |
| | | Example 3 | | | 350 | 11 | 455 | |
| | | Comparative Example 4 | | | 355 | 12 | 495 | |
| | Resin C | Comparative Example 5 | 0 | 340 | 345 | 11 | 380 | 310° C. × 12 hr |
| | | Comparative Example 6 | | | 355 | 12 | 450 | |
| | | Comparative Example 7 | | | 360 | 13 | 495 | |
| | Resin D | Comparative Example 8 | 27.0 | 290 | 310 | 12 | 410 | 280° C. × 12 hr |
| | | Comparative Example 9 | | | 315 | 13 | 470 | |
| | | Comparative Example 10 | | | 315 | 13 | 495 | |

TABLE 2

| | Before Heat Treatment | | After Heat Treatment | |
|---|---|---|---|---|
| Examples/Comparative Examples | Orientation Degree (%) | Strength (cN/dtex) | Orientation Degree (%) | Strength (cN/dtex) |
| Comparative Example 1 | 85 | 8 | 91 | 20 |
| Example 1 | 90 | 8 | 95 | 25 |
| Example 2 | 94 | 8 | 95 | 26 |
| Comparative Example 2 | 96 | 8 | 95 | 22 |
| Comparative Example 3 | 87 | 7 | 93 | 21 |
| Example 3 | 93 | 7 | 94 | 25 |
| Comparative Example 4 | 96 | 7 | 96 | 22 |
| Comparative Example 5 | 86 | 8 | 92 | 20 |
| Comparative Example 6 | 93 | 8 | 96 | 22 |
| Comparative Example 7 | 96 | 8 | 96 | 22 |
| Comparative Example 8 | 84 | 7 | 90 | 17 |
| Comparative Example 9 | 92 | 7 | 95 | 21 |
| Comparative Example 10 | 96 | 7 | 96 | 22 |

From the results shown in Tables 1 and 2, it has been found that from the liquid crystal polyester fibers according to one aspect of the present invention, liquid crystal polyester fibers having an increased tensile strength can be obtained.

The above result shows that the present invention is useful.

INDUSTRIAL APPLICABILITY

According to the present invention, is possible to provide liquid crystal polyester fibers from which liquid crystal polyester fibers having an increased strength can be obtained, and highly strengthened liquid crystal polyester fibers, and thus the present invention is industrially extremely useful.

EXPLANATION OF REFERENCES 1 spinning device
11 extruder
12 gear pump
13 nozzle portion
14 take-up roller
15 winding portion
16 resin flow path

The invention claimed is:

1. A liquid crystal polyester fiber comprising:
a liquid crystal polyester,
wherein a tensile strength is 25 cN/dtex to 30 cN/dtex, and an orientation degree of the liquid crystal polyester in a length direction of the fiber is 94% to less than 100%,
wherein the liquid crystal polyester has a repeating unit represented by Formula (1), a repeating unit represented by Formula (2), and a repeating unit represented by Formula (3),
at least one repeating unit selected from the group consisting of the repeating unit represented by Formula (1), the repeating unit represented by Formula (2), and the repeating unit represented by Formula (3) contains a 2,6-naphthylene group,
a content of the repeating unit containing the 2,6-naphthylene group is 68 mol % to 80 mol % with respect to a total content of all the repeating units of the liquid crystal polyester, and
the liquid crystal polyester fiber has a fiber diameter of 5 μm to 100 μm, $$—O—Ar^1—CO— \qquad (1),$$

$$—CO—Ar^2—CO— \qquad (2), \text{ and}$$

$$—X—Ar^3—Y— \qquad (3),$$

wherein $Ar^1$ represents a phenylene group, a naphthylene group, or a biphenylylene group, $Ar^2$ and $Ar^3$ each independently represent a phenylene group, a naphthylene group, or a biphenylylene group, at least one selected from the group consisting of $Ar^1$, $Ar^2$, and $Ar^3$ contains a 2,6-naphthylene group, X and Y each independently represent an oxygen atom or an imino group (—NH—), and hydrogen atoms of the group represented by $Ar^1$, $Ar^2$, or $Ar^3$ are optionally each independently substituted with a halogen atom, an alkyl group having 1 to 10 carbon atoms, or an aryl group having 6 to 20 carbon atoms.

2. The liquid crystal polyester fiber according to claim 1, wherein the content of the repeating unit containing the 2,6-naphthylene group is 70 mol % to 80 mol % with respect to the total content of all the repeating units of the liquid crystal polyester.

* * * * *